Nov. 12, 1968   A. F. HICKMAN   3,410,573
SPRING SUSPENSION

Filed Nov. 3, 1966                  7 Sheets-Sheet 1

INVENTOR.
Albert F. Hickman
BY
Popp and Sommer
ATTORNEYS.

Fig. 3.

Nov. 12, 1968   A. F. HICKMAN   3,410,573
SPRING SUSPENSION

Filed Nov. 3, 1966                    7 Sheets-Sheet 7

INVENTOR.
Albert F. Hickman
BY
Popp and Sommer
ATTORNEYS.

United States Patent Office 3,410,573
Patented Nov. 12, 1968

3,410,573
SPRING SUSPENSION
Albert F. Hickman, Eden, N.Y. 14057
Continuation-in-part of application Ser. No. 484,849,
Sept. 3, 1965. This application Nov. 3, 1966, Ser.
No. 591,899
16 Claims. (Cl. 280—104.5)

ABSTRACT OF THE DISCLOSURE

While not limited to any particular service, the suspension is shown as being a so-called independent wheel suspension between a frame and one of its supporting wheels, the wheel rotatably supporting an axle and the axle supporting the free end of a first arm which is in turn fixed to a hub member or cross shaft journalled on the frame. A second arm is fixed to and projects radially from the hub member and compressively bears against the end of a resilient rubber body connected to the frame, the second arm acting upon the rubber body in direct compression to expand and contract the rubber body laterally of the force of such compression to provide substantially the entire resiliency in supporting the frame upon the wheel.

This application is a continuation-in-part of my copending application for Heavy Duty Vehicle Spring Suspension Ser. No. 484,849, filed Sept. 3, 1965 now Patent No. 3,298,711 dated Jan. 17, 1967.

This invention relates to a heavy duty vehicle spring suspension, such as for highway and off-the-road heavy duty service, and more particularly to such a heavy duty suspension in which each wheel is capable of vertical movement independently of the other wheels supporting the vehicle frame. For the purpose of the application the designation of a wheel is meant to include both a single tire wheel and also a so-called dual tire wheel, that is, a wheel composed of two rim structures bolted together, side-by-side and each having a rubber tire. The present invention can be adapted to single independent wheels supporting opposite sides of the rear end of a heavy duty vehicle frame; a pair of independent wheels in tandem supporting each side of the rear end of such a vehicle frame; or a group of three or more independent wheels in tandem so supporting each side of the rear end of a vehicle frame. The present invention is more particularly directed to such a suspension in which the spring means interposed between and resiliently supporting the vehicle frame on each wheel is in the form of one or more resilient rubber blocks which are compressed to provide the resilient resistance, although features of the invention are not limited to the use of such rubber blocks as the resilient support. The tandem wheel forms of the invention are further characterized by load transfer at each side of the vehicle frame from one tandem wheel to another through their individual rubber blocks so that these rubber blocks are additive in compression, in providing a resilient support for the vehicle frame.

In common with this earlier application, general objects of the present invention are to provide such a suspension which is free from friction but is controlled by an increased resistance to motion in proportion to the amplitude and velocity of vertical main frame movement; which consists of compact components which are arranged so as not to interfere with frame and wheel movement and in which the vertical moving parts are arranged inside and close to the wheels and provide high and wide support for the vehicle frame on the stub axles with resulting increased stability; which can have softer springs than those now on the market for equivalent duty and at the same time have greater sidesway control through high and wide spring mountings; which can have many years and hundreds of thousands of miles of carefree operation; in which substantially all suspension bearings, other than the wheel bearings, can be in the form of rubber bodies distorted to provide the required movement and being free from friction and lubrication or other service requirements; which is light in weight, particularly in unsprung weight; which is low in both initial cost and upkeep; which renders auxiliary devices for the control of sideway unnecessary; and in which periodic vibration of the suspension is dampened out.

An important specific object of the present invention is to provide such an independent wheel suspension which is adapted for very heavy duty highway and off the road service and can be adapted to single wheels supporting opposite sides of the vehicle frame or two, or three or more independent wheels in tandem at each side of the vehicle frame.

Another specific object of the invention is, in such tandem wheel suspensions, to provide load transfer between or among the tandem wheels at each side of the vehicle frame so that an excess load on any one wheel is transmitted to its companion tandem wheel or wheels on the same side of the vehicle frame.

Another specific object of the invention is to provide such a tandem independent wheel suspension in which the compressive action of the several rubber blocks of each group of tandem wheels on one side of the vehicle frame is cumulative so as to contribute jointly to a softer and low frequency ride.

Another most important specific object of the present invention is to provide such a suspension in which the majority of components form a single wheel suspension, two tandem wheel suspension, and a three or more tandem wheel suspension can all be made identical and have identical connections with one another and the vehicle frame, the various types of suspensions differing essentially in minor equalizing and self-steering connections where the invention is embodied in a tandem wheel suspension or six wheel suspension.

Another important object of the invention is to provide, in a tandem wheel suspenion, a simple and effective means for rendering the wheels self-steering so as to avoid tire scuff in steering the vehicle around a curve or into and out of traffic.

Other objects and advantages of the invention will be apparent from the following description and drawings in which.

*The vehicle frame, all figures*

Figure 14:
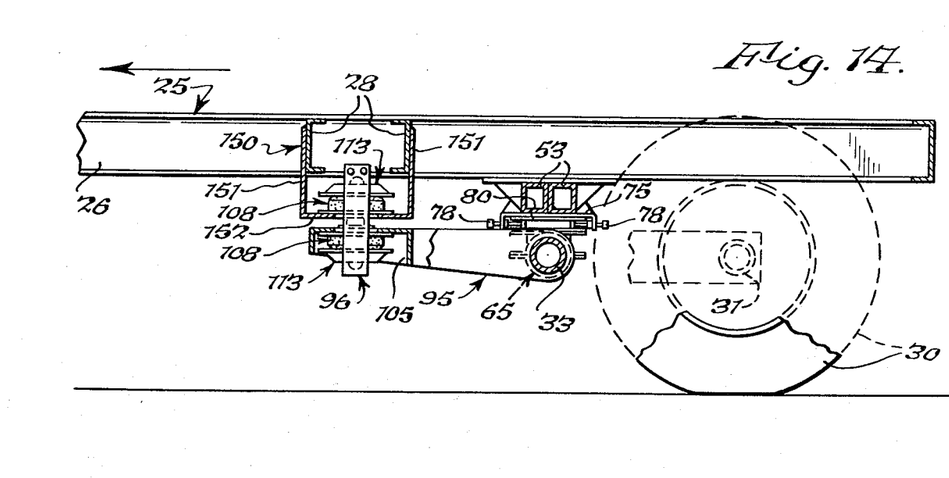
FIG. 14 is a view similar to FIG. 2 illustrating the form of the invention shown in FIG. 13.

The main frame 25 of the vehicle can be of any suitable construction and is shown as comprising a pair of main longitudinal side frame bars 26, these main longitudinal side frame bars 26 being in the form of inwardly facing channels which are shown as straight and parallel and connected at their rear ends by a cross bar shown as being in the form of inwardly facing channel 27 and which can also be connected by intermediate cross channel bars 28 as shown in FIG. 14.

*Two tandem axle suspension, FIGS. 1–10*

Figure 1:
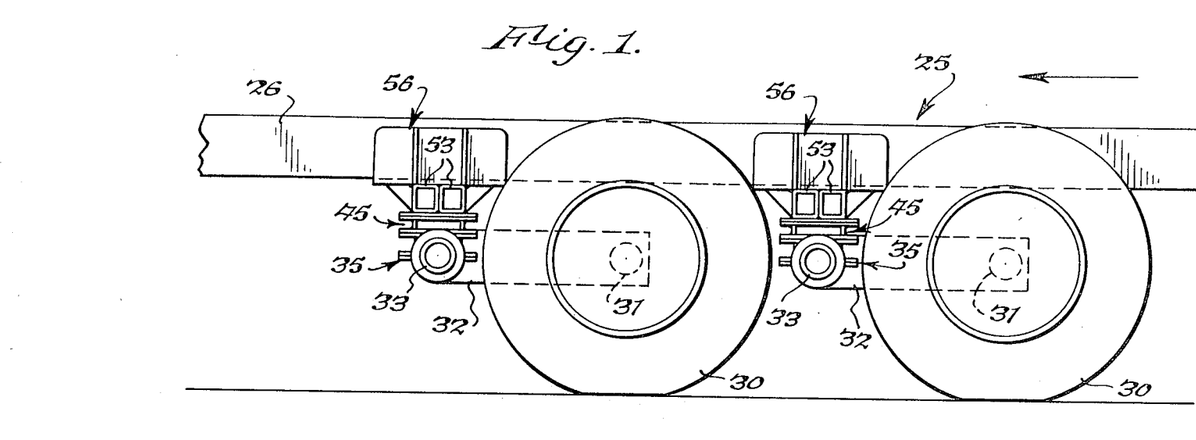
FIG. 1 is a fragmentary side elevational view of the rear end of the vehicle frame in the position of carrying a normal load and supported at each side by a two tandem wheel suspension embodying the present invention, parts being omitted for the purpose of clarity, this view being taken on line 1—1, FIG. 3. In this and other views the direction of movement of the vehicle is shown by a large overhead arrow.
Figure 2:
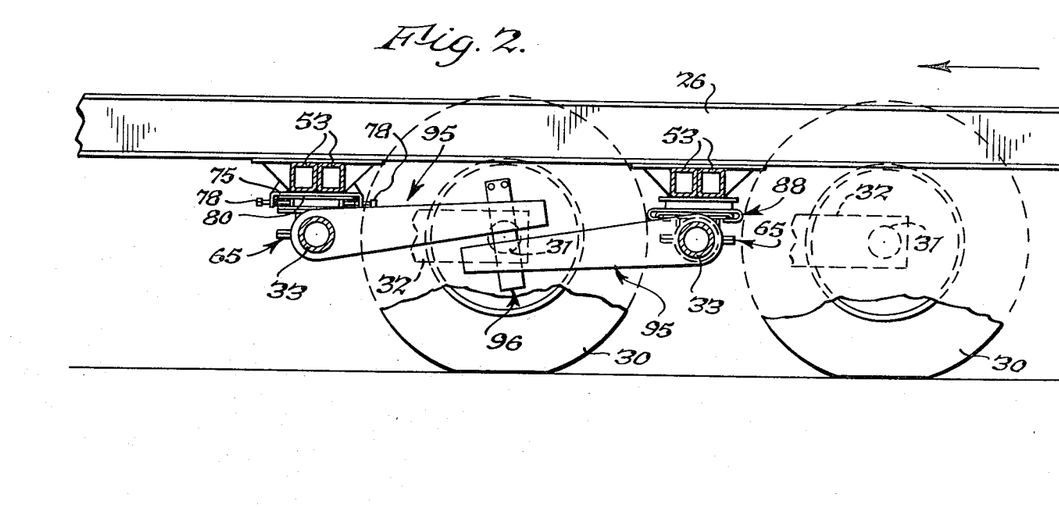
FIG. 2 is a fragmentary longitudinal section thereof taken generally on line 2—2, FIG. 3.
Figure 3:
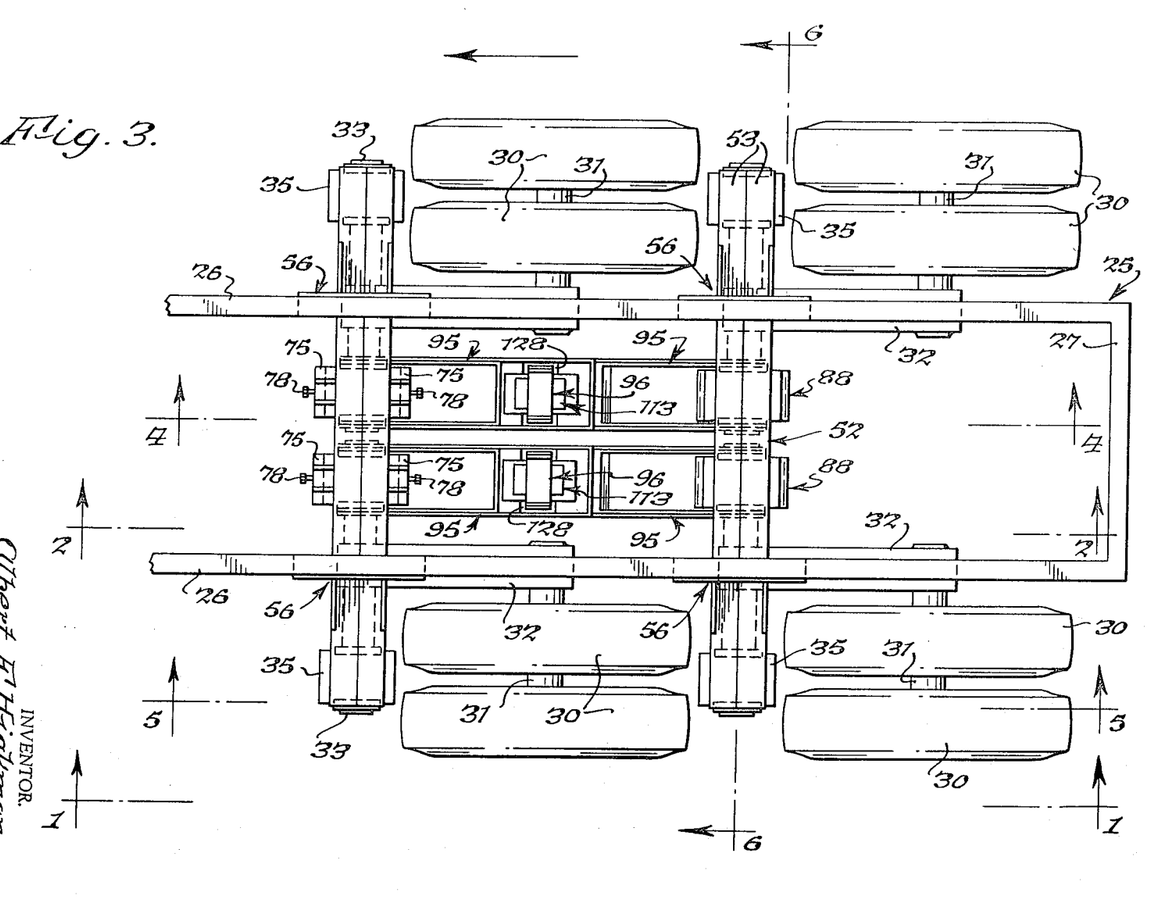
FIG. 3 is a fragmentary top plan view of the rear end of the frame and two tandem wheel suspensions shown in FIGS. 1 and 2.

As with the other forms of the invention, the frame 25 is shown as supported by rubber tired wheels 30, these wheels being shown in the form of dual tire wheels, that is, pairs of rim structures bolted together side-by-side and each pair of rim structures being journalled on a stub axle 31 in any suitable manner (not shown), these stub axles extending horizontally transversely of the line of movement of the vehicle and the stub axles 31 at opposite sides of the vehicle being normally arranged axially in line with each other as best shown in FIG. 3. Each stub axle is welded or otherwise fixed to the end of an arm 32 which can be of any suitable form but is shown as being of rectangular tubular form in cross section with the stub axle 31 extending through and being welded to its outboard end, as best shown in FIG. 3. The inboard end of each arm 32 is welded to a horizontal cross shaft 33. This cross shaft is in the form of round tubular cross shaft extending horizontally transversely of the line of movement of the vehicle frame and being arranged parallel with its stub axle 31 and the axis of its wheel 30.

Figure 5:
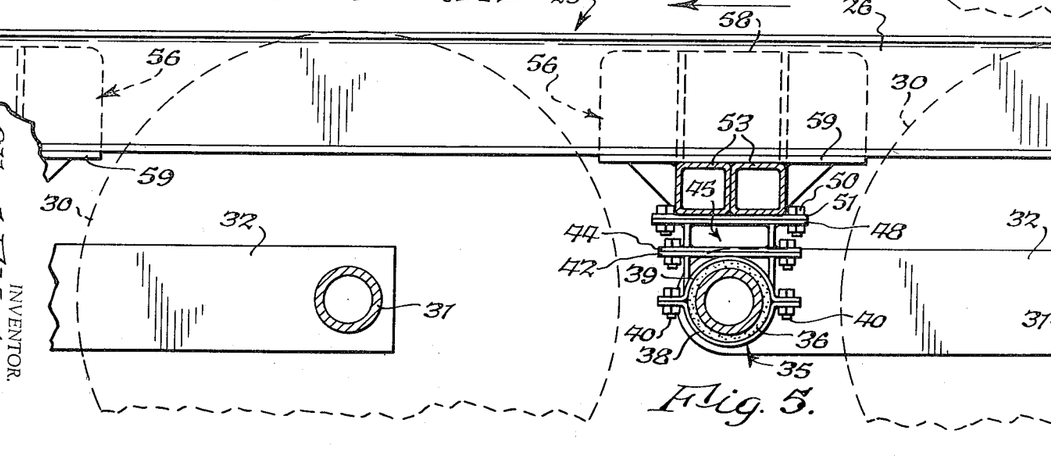
Figure 6:
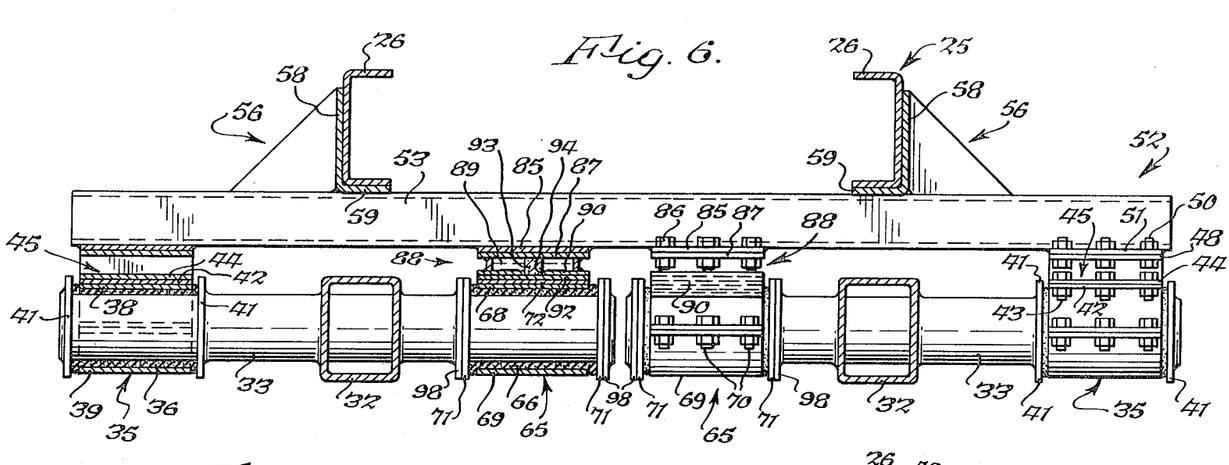
FIG. 6 is an enlarged vertical transverse section taken on line 6—6, FIGS. 3 and 4, parts being shown in elevation.
Figures 7, 8:
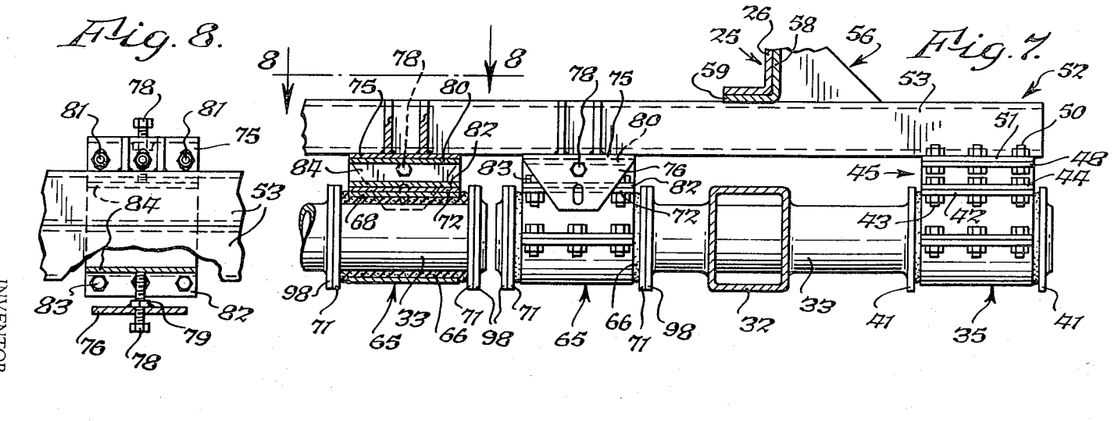
FIG. 7 is a fragmentary transverse section taken generally on line 7—7, FIG. 4, parts being shown in elevation.
FIG. 8 is a fragmentary top elevational view taken on line 8—8, FIG. 7.
Figure 9:
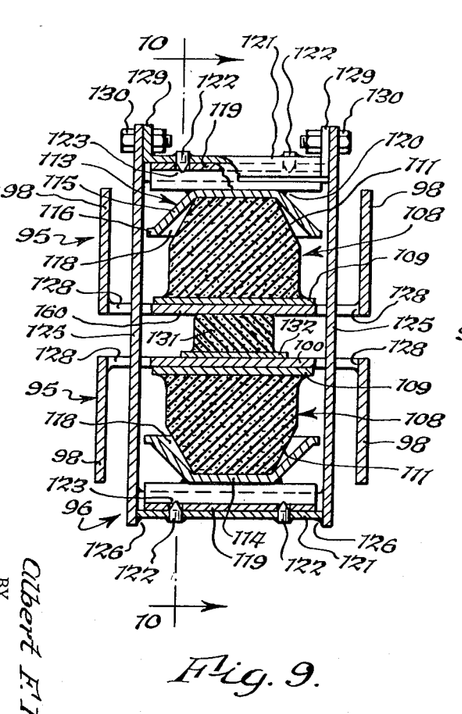
FIG. 9 is a further enlarged generally upright section taken on line 9—9, FIG. 4, and showing the rubber block compression spring shackle forming a principal feature of the invention.
Figure 10:
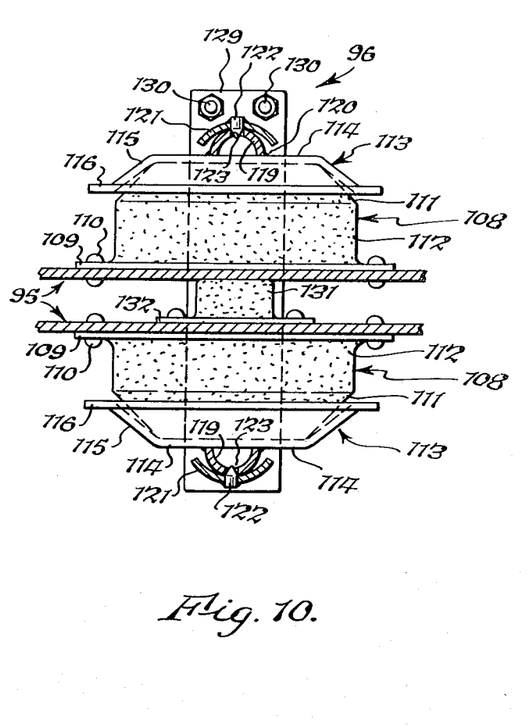
FIG. 10 is a fragmentary section, longitudinally of the vehicle frame, taken generally on line 10—10, FIG. 9.

The outer end of each tubular cross shaft 33 is journalled in a bearing 35 which is preferably in the form of a rubber bushed bearing. As best shown in FIGS. 5 and 6, each of these bearings 35 is shown as comprising a rubber bushing 36 surrounding and held in compressive relation with the outboard end of its tubular cross shaft 33 by half bearing housings 38 and 39, these half bearing housings being drawn into compressive relation with each other by bolts 40. The ends of the rubber bushings 36 project beyond the half bearing housings 38, 39 and abut against abutment rings 41 welded to the companion cross shaft 33 as best shown in FIGS. 6 and 7. Each half bearing housing 39 is provided with a horizontal plate 42 welded thereto and which is bolted, as by bolts 43, to the bottom plate 44 of a spacer block 45, one or more adjustment shims 45 (left hand FIG. 6) being interposed between these plates 42, 44, for alinement purposes. The top plate 48 of each spacer block 45 is bolted as by bolts 50 to the underside of a plate 51 welded to the outboard end of a tubular cross bolster 52 formed by a pair of identical tubes 53 of rectangular form in cross section arranged side-by-side and welded to each other. Each tubular bolster 52 extends under both main longitudinal side bars 26 of the vehicle frame 25 and is secured at each end to the corresponding main longitudinal side frame bar 26 by a frame bracket 56. Each frame bracket comprises a vertical plate 58 secured in any suitable manner to the outside of each main longitudinal side frame bar 26 and having a flange 59 underlying this main longitudinal side frame bar and overlaying the cross bolster 52 as best shown in FIGS. 5–7.

Figure 4:
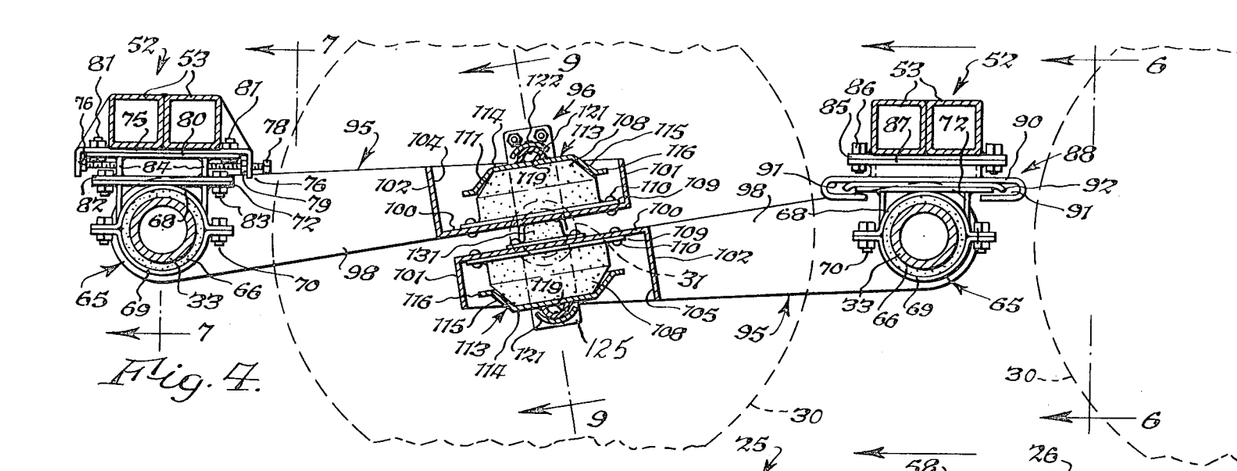
FIGS. 4 and 5 are enlarged fragmentary vertical longitudinal sectional views taken on the correspondingly numbered lines, FIG. 3.

The inner end of each tubular cross shaft 33 is connected to the corresponding cross bolster 52 by a bearing 65 which is also preferably a rubber bushed bearing. As best shown in FIGS. 4 and 6, each bearing 65 comprises a rubber bushing 66 surrounding and held in compressive relation with the inner end of the corresponding tubular cross shaft 33 by a pair of half bearing housings 68, 69, these half bearing housings being drawn into compressive relation with the rubber bushing 66 by bolts 70. The opposite ends of each rubber bushing 66 protrudes beyond its half bearing housings 68 and 69 and abut against abutment rings 71 welded to the inner end of the cross shaft 33 in spaced relation to each other. The half bearing housing 68 is provided with a cross plate 72 suitably welded thereto.

This half bearing housing 68 for the front cross shaft 33 is secured to the corresponding cross bolster 52 as follows:

The numeral 75 represents a horizontal plate welded to the underside of the front bolster 52 above each of the bearings 65 for the front axle 33. This plate 75 is provided with front and rear downwardly projecting flanges 76 each of which carries an adjusting screw 78 extending through a threaded hole 77 in its flange 76 lengthwise of the line of travel of the vehicle. Each screw 78 carries a lock nut 79 to hold it in any adjusted position. These adjusting screws 78 abut against opposite sides of a structure comprising an upper plate 80 having slots (not shown) through which is attached by bolts 81 to the corresponding frame plate 75, a bottom plate 82 resting on and secured by bolts 83 to the cross plate 72 of the corresponding half bearing housing 68 and vertical plates 84 connecting these plates 80, 82 and extending lengthwise of the cross shafts 33 to provide abutments for the adjusting screws 76.

The upper half bearing 65 for the rear cross shaft 33 is secured to the frame 25 as follows:

The numeral 85 represents a horizontal plate welded to the underside of the bolster 52 above each of the bearings 65 for the rear cross rods 33. To each plate 85 is secured, as by bolts 86, a metal plate 87 which forms the top wall of a rectangular oil box 88 filled with oil 89 as shown in FIG. 6. As best shown in FIG. 4, the fore-and-aft edges of the bottom plate 90 are of reversely formed or horizontal channel shape in cross section, the channels 91 opening toward each other. This bottom plate 90 for the bearing 65 for each rear cross shaft 33 is preferably made of graphite impregnated bronze and slidingly rests upon a hard steel plate 92, the fore-and-aft edges of which are arranged in the channels 91 so that when the frame 25 is jacked up to cause the rear wheels 30 to leave the ground, the rear wheel bearings 65 will be prevented from falling free from the slide bearing plates 90. The fore-and-aft edges of the plate 72 for each rear half bearing housing 68 also preferably project into these opposing channels 91. Desirably a wick 93 meters the oil 89 from the interior of the oil box 88 through a hole 94 in the graphite impregnated bronze plate 90 to the top face of the hard steel plate 92 on which it slidingly bears. Each wick 93 also acts, through capillarity, to feed the oil 89 upwardly as is required for the three tandem wheel suspension shown in FIGS. 11 and 12. These sliding bearing plates 90, 92 permits fore-and-aft movement of the inner end of each rear cross shaft 33 to render the rear tandem wheels 30 self-steering, as hereinafter described.

In the two tandem wheel suspension shown in FIGS. 1–10, a compensating arm, indicated generally at 95, is secured to the inner end of each of the cross shafts 33, these compensating arms extending generally horizontally in the direction of the line of movement of the vehicle toward a companion compensating lever 95 of the other cross shaft 33, and the outboard ends of these compensating levers are connected to each other by a shackle 96 which provides substantially the entire resilient resistance between the vehicle frame 25 and the wheels 30. These compensating arms are shown as constructed as follows:

Each compensating lever 95 comprises a pair of side plates 98 severally provided with openings by means of which they are fitted around and welded to the inner end of the corresponding cross shaft 33, these side plates being fitted against the corresponding abutment rings 71 so that these side plates 98 are arranged on opposite sides of the companion bearing 65. The outboard ends of each pair of side plates 98 are connected together by a cross plate 100 connecting longitudinal edges thereof and cross plates 101, 102 extending perpendicularly from the fore-and-aft edges of the companion plate 100 and bridging the space between the pair of side plates 98. Preferably these plates 100, 101, 102 for each compensating arm of the front cross shafts 33 form an upwardly opening pocket 104 whereas these plates for each compensating arm 95 for the rear cross shafts 33 form a downwardly opening pocket 105.

In each of these pockets is arranged a rubber block 108 which is vulcanized to a plate 109 secured, as by rivets 110 to the companion plate 100. On the side remote from the anchoring face of its plate 109 each rubber block 108 is shown as being of frusto-conical form, as indicated at 111, the body portion 112 of the rubber block 108 being of horizontally elongated rounding form.

A metal compression plate or cup 113 is held in pressure contact with the conical end 111 of each rubber block 108. Each of these cups 113 comprises a flat central portion 114 bearing against the flat end of its rubber block 108; a frusto-conical portion 115, and an annular flange 116 projecting outwardly generally parallel with the flat portion 114. The flare of the frusto-conical portion 115 of each compression plate or cup 113 is preferably more divergent than the frusto-conical portion 111 of its rubber block 108 so that a space 118 is left between these frusto-conical portions to permit expansion of the rubber block 108 in permitting vertical movement of the frame 25 relative to the road.

A semicircular channel bar 119, extending horizontally transversely of the line of movement of the vehicle, is welded at its center, as indicated at 120, to the exterior of the flat portion 114 of each compression plate or cup 113. In rolling contact with the salient side of each of these semicircular bars 119 is the concavity of another semicircular channel bar 121, these bars preferably being held against displacement with reference to each other, other than through rolling contact, by a pair of pins 122 welded to the bars 121 and projecting into openings 123 in the salient side of each bar 119. It will be seen that each bar 121 provides a rolling socket joint for its bar 119. The cross bars 121 for each shackle 96 are connected together by shackle links 125. For this purpose one end of each of these links 125 is welded, as indicated at 126, to the corresponding end of one cross bar 121 and extends through openings 128 in the companion pair of plates 100 to alongside the other cross bar 121. This other cross bar 121 is provided with perpendicular end flanges 129 by means of which it is secured, by bolts 130, to the corresponding links 125.

Each shackle 96 also includes a rebound rubber block 131 compressed between the plates 100 of the companion pair of compensating arms 95 and preferably secured to one of these plates by means of a metal base disk 132 to which it is vulcanized.

*Operation FIGS. 1–10*

The direction of movement of the vehicle is shown by the large arrows above FIGS. 1–5 and in the operation of the form of the invention illustrated in FIGS. 1–10 the upward movement of one, say, of the front wheel stub axles 31 effects corresponding upward movement of its arm 32 and counterclockwise movement of the tubular cross shaft 33 forming the hub of this arm, such movement being permitted by the rubber bushings 36 and 66 of the bearings 35 and 65, respectively, which are located at such points as to prevent cantilever or corner loading of these bearings. Each bearing 35 is located, for this purpose to be at least in part outside of the plane of the inner circular face of the inside tire 30 and preferably, as shown, in line with its wheels 30, as best shown in FIG. 3. Each inner bearing 65 is located, for this purpose, within the area directly below the center part of the vehicle frame 25 so as to prevent corner loading of these bearings 35 and 65. It will therefore be seen that the T-arm support for each wheel, provided by the tubular cross shaft 33 and the arm 32 welded thereto, provides stability, the bearings 35, 36 being spaced wide enough apart to provide a stable support for the corresponding stub axle 31 and also being so located as to prevent cantilever or corner loading of these bearings.

The angular counterclockwise movement of the tubular cross shaft 33 of the assumed front wheel 30 at one side of the vehicle is transmitted directly to the compensating lever 95 fixed thereto, this lever being composed of the pair of side plates 98 welded to each cross shaft 33 on opposite sides of its bearing 65 as best shown in FIGS. 4, 6 and 7. Hence this angular movement of the front wheel cross shaft 33 causes an upward angular movement of its compensating lever 95 thereby, through the corresponding shackle 96, effecting an upward angular movement of the companion compensating lever 95 associated with the companion rear tandem wheel 30. This angular movement of the compensating lever 95 for the rear wheel 30 is transmitted directly to the rear tubular cross shaft 33 welded thereto. This imposes a corresponding downward movement of the assumed rear wheel compensating lever 95 and the stub axle 31 of the rear dual-tire tandem wheel 30 thereby to provide load transfer, that is, equalized loading between each pair of front and rear dual-tire tandem wheels 30 at each side of the vehicle.

It will be particularly noted that this load transfer from one to the other of the wheels 30 at each side of the vehicle is transmitted compressively through the two resilient rubber blocks 108 forming part of the companion shackle 96, these rubber blocks forming substantially the entire resilient support for the frame 25 on the wheels. Thus, the downward pressure of the upper compression plate or cup 113 serves to compress and distort the upper frusto-conical portion 111 of the upper rubber block 108 into the divergent space 118 between it and the frusto-conical part 115 of the compression plate or cup. Similarly the upward pressure of the bottom compression plate or cup 113 serves first to distort or spread the frusto-conical portion 111 of the bottom rubber block 108 into the surrounding space 118 provided by the greater flare of its compression plate or cup 113. This distortion is effected by comparatively light forces from the wheels in driving over irregularities in the road, especially when unloaded, so that the frusto-conical portions 111 provide a variable rate spring, that is, one which becomes more resistive as greater loads are impressed thereon and as the frusto-conical portions 111 of the rubber blocks distort to progressively fill the compression plates or cups 113. Obviously the relative shape of the ends 111 of the rubber blocks 108 in relation to the shapes of the interior portions of the compression plates or cups 113 can be designed to provide any desired kind of variation in the spring rate under varying loads, the frusto-conical shape being selected as exemplary.

Under heavy forces, the downward pressure of the top compression plate or cup 113 in opposition to the upward pressure of the bottom compression plate or cup 113 serves to completely fill these cups and to compress the cylindrical portions 112 of these rubber blocks. These portions 112, of course, distort radially under such heavy forces but due to their size eliminate the need for bottoming stops since any force encountered is incapable of flattening these cylindrical portions 112 into wafer form.

Under rebound action, the rubber blocks 108 are incapable of separating from operative contact with the insides of their compression plates or cups 113 by virtue of the small rebound rubber block 131 interposed between the opposing faces of the flat end plates 100 of the two compensating arms 95, these rubber blocks 131 serving to hold the shackles 96 under pressure, against rattling or displacement of parts, at all times. It will particularly be noted that each rubber rebound block 131 serves to hold the semicircular channel bars 119 in rolling contact with the inside of the semicircular channel bars 121 connected by the shackle links 125 so that these bars merely have rolling or rocking contact with one another and cannot jump apart and create a noisy condition. It will also be noted that the pins 122 prevent relative longitudinal movement of these bars 119, 121 so as to maintain the cups 113 in axial alinement with both the rubber blocks 108 as well as the interposed rebound rubber block 131.

An important feature of the tandem wheel suspension of FIGS. 1–10 is that it is self-steering, that is, in rounding a curve, the spindles 31 of the rear tandem wheels 30 will assume such angles in a horizontal plane, with reference to the spindles 31 of the front tandem wheels 30, as will enable all of the wheels to round the curve without tire scuffing. This self-steering is effected by the flat sliding bearing plates 90, 92 interposed between the inner bearings 65 for the rear tandem wheels 30 and the frame 25 so as to permit limited fore-and-aft movement of the inner ends of the rear cross shafts 33. Thus, referring to FIG. 3, in rounding a curve, say, to the right, the rear pair of tandem wheels 30 will be drawn to the right (with reference to the frame 25), by the swinging of the rear end of the frame 25 to the left, through their frictional engagement with the roadway, in order to avoid tire scuffing in rounding the curve. If this were resisted, tire scuffing would take place, but such movement of the rear tandem wheels is permitted, the rear tandem wheels spindle arms 32, cross shafts 33 and bearings 65 swinging counterclockwise about vertical axes intersecting the bearings 35 to permit the rear tandem wheels 30 to track properly around the curve without tire scuff. This movement is permitted by the sliding engagement between the graphite impregnated bearing plate 90 on the hard steel plate 92, the movement of the former permitting the required forward movement of the inner end of the left hand cross shaft 33 and the required rearward movement of the inner end of the right hand cross shaft 33 for this purpose. On returning to a straightaway, the rear pair of rubber tired wheels 30, again to avoid tire scuff, return to their normal coaxial relation shown.

It will be seen that each pair of rubber bodies 108 are acted upon in direct compression from their opposite top and bottom extremities generally along a center line of the path of movement of the outbard extremity of their lever 95 and that these bodies expand toward and from this center line to provide substantially the entire resilient resistance in supporting the frame 25 on the corresponding wheel 30.

Figure 11:
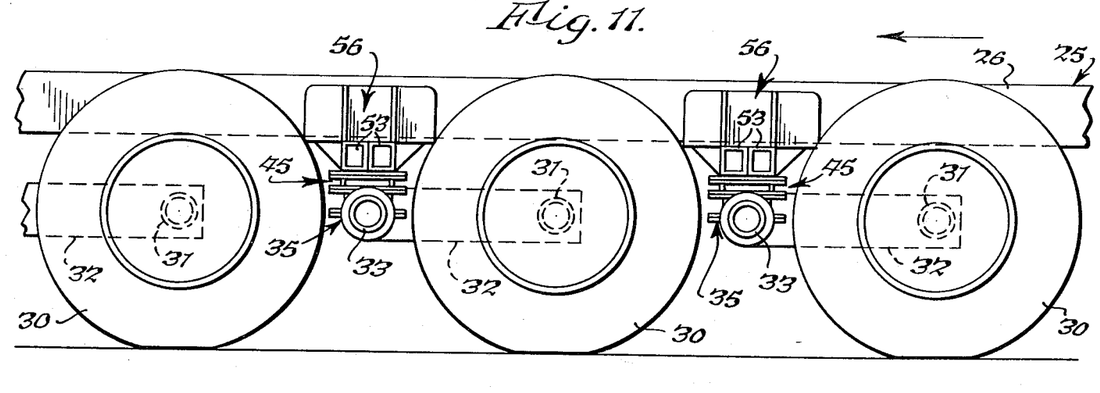
FIG. 11 is a fragmentary side elevational view similar to FIG. 1 and illustrating a modified form of the invention in which the vehicle suspension at each side is in the form of a three tandem wheel suspension.
Figure 12:
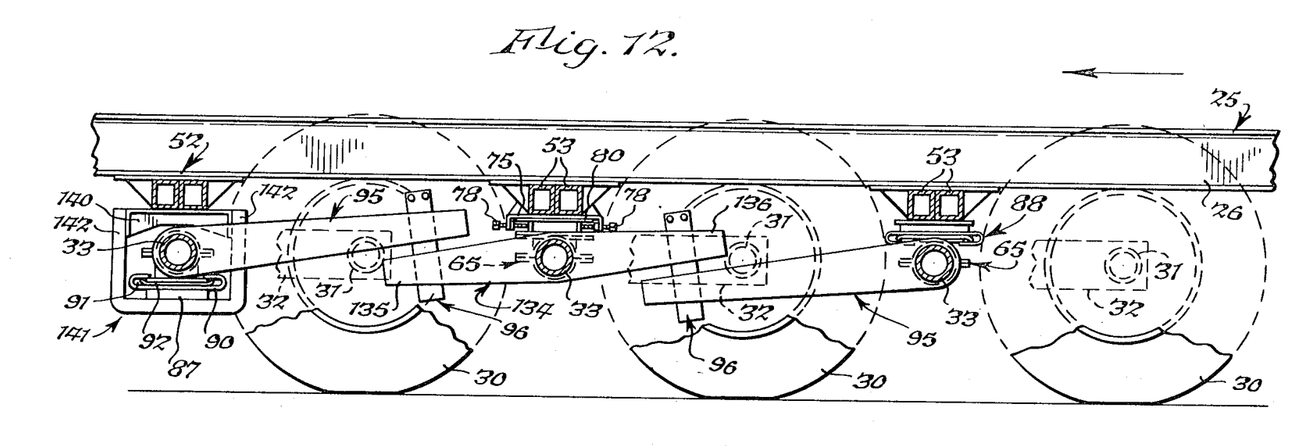
FIG. 12 is a view similar to FIG. 2 and illustrating the form of the invention shown in FIG. 11.

*Three tandem wheel suspension, FIGS. 11 and 12*

All of the parts used to provide the two tandem wheel suspension shown in FIGS. 1–10 are used in producing the three tandem wheel suspension shown in FIGS. 16 and 17 and hence the same reference numerals have been used and a description of their construction and mounting will not be repeated. This three tandem wheel suspension is distinguished, however, both by a different form of compensating lever 134 connecting the suspension for each of the center dual-wheels 30 with the suspension for the companion front and rear dual-wheels 30 so as to effect load equalization among all of the tandem wheels at each side of the vehicle, and also by a different form of resilient mounting for the inner end of each front tubular cross shaft 33 to effect self-steering of the vehicle.

This compensating lever 134 is double-ended or in the form of a walking beam, the forward end lever of which is indicated at 135 and the rear end lever of which is indicated at 136. Each end lever of this walking beam 134 can be of the same construction as the compensating levers 95 and is journalled on the frame 25 by means of a frame bearing identical to the frame bearings 35 and 65, including the adjusting mechanism 75–84 for the bearing 65 illustrated at the left of FIG. 4 and in FIG. 8. The rear end lever 136 of each walking beam 134 is connected by a shackle 96 to the forward end of the equalizing lever 95 of the corresponding rearmost tandem wheel 30. The forward end lever 135 of this walking beam is connected by a shackle 96 to the rear end of the equalizing lever 95 of the foremost wheel 30. The cross shaft 33 of the foremost wheel 30 can be connected to the outer end of the bolster 55 by a rubber bushed bearing 35 in the same manner as with the form of the invention shown in FIGS. 1–10. However, with this particular foremost cross shaft 33, it is important that the horizontal bearing plates 90, 92 by means of which self-steering and automatic self-alinement of the multiple wheel suspension is achieved, be arranged under the corresponding bearing 65 at the inner end of its tubular cross shaft 33 instead of above the tubular cross shaft as illustrated in FIGS. 4 and 6. To this end a frame plate 140 is secured, as by welding, to the underside of the foremost bolster 52 above each of the bearings 65, this frame bracket extending forwardly and rearwardly from this bolster. A U-shaped bracket 141 has its upstanding arms 142 embracing and fixed to the front and rear side of this frame plate 140 with its cross part 143 arranged below the inner end of the cross shaft 33 as best shown at the left of FIG. 12. On this cross part 143 is fixed, in any suitable manner, and inverted as compared with FIGS. 1–10, a rectangular oil box 88, the top plate 90 of which is of graphite impregnated bronze. This bronze plate slidingly supports a hard steel plate 92. This hard steel plate 92 has its fore-and-aft edges arranged in the channels 91 provided at the front and rear of the bronze plate 90 and is suitably secured to the underside of the corresponding half bearing housing 69 to slidingly support the corresponding bearing 65.

In operation of the three tandem wheel form of the invention illustrated in FIGS. 11 and 12, the upward movement of, say, the foremost wheel 30 at one side of the vehicle effects upward movement of its stub axle 31 to effect corresponding angular upward movement of its arm 32 and its tubular cross shaft 33, such movement being permitted by the rubber bushings 36 and 66 of the bearings 35 and 65, respectively. This rotation of the tubular cross shaft of the assumed foremost wheel 30 at one side of the vehicle is transmitted directly to the compensating lever 95 fixed thereto, and hence causes, through the corresponding shackle 96, an upward angular movement of the forward end 135 of the double ended lever or walking beam 134.

This walking beam is fixed to its central cross shaft 33 in turn journalled in its frame bearings 35 and 65, the latter being preferably adjustable lengthwise of the frame by screws 78 in the same manner as with the front cross shaft 33 with the form of the invention shown in FIGS. 1–10.

The downward movement of the forward end 135 of the double ended lever or walking beam 134 also effects upward movement of the rear end 136 thereof and hence, through the corresponding shackle 96, upward movement of the compensating lever 95 fixed to the rearmost cross shaft 33. This imposes, through the corresponding arm 32, downward pressure on the stub axle 31 of the rearmost wheel 30. This downward force imposed upon the arms 32 and stub axles 31 of the center and rearmost wheels 30 distributes the assumed load imposed on the foremost wheel 30 to these center and rearmost wheels so as to effect load distribution among them. With the form of the invention shown in FIGS. 11 and 12 the shackles 96 are of the form illustrated in detail in FIGS. 9 and 10 and hence this load transfer is through the resilient rubber blocks 108 in compression and which serves to provide the required spring support for the vehicle frame 25 on the wheels 30.

As with the form of the invention shown in FIGS. 1–10, the three tandem wheel suspension shown in FIGS. 11–12 is self-steering in that the inner bearings 65 of the cross shafts 33 of the front and rear wheels 30 are free to move fore-and-aft and hence assume a self-steering angularity both in rounding curves and also in returning to the straightaway. This fore-and-aft freedom of the inner ends of these cross shafts 33 is provided by the graphite impregnated and hard steel plates 90, 92 which slide horizontally with reference to each other and are interposed between the frame 25 and the bearings 65 for these cross shafts 33 for the front and rear wheels 30. Accordingly, while the center wheel 30 of the three at each side of the vehicle is held in a fixed axial position with reference to the frame 25 by its bearings 35 and 65, the other two cross shafts 33 are free to move about the vertical axes of their bearings 35 to inwardly converging relation to each other (in rounding a curve and in avoiding tire scuff) and to parallel relation to each other and to the center cross shaft 33 (in returning to a straightaway and again to avoid tire scuff).

Figure 13:
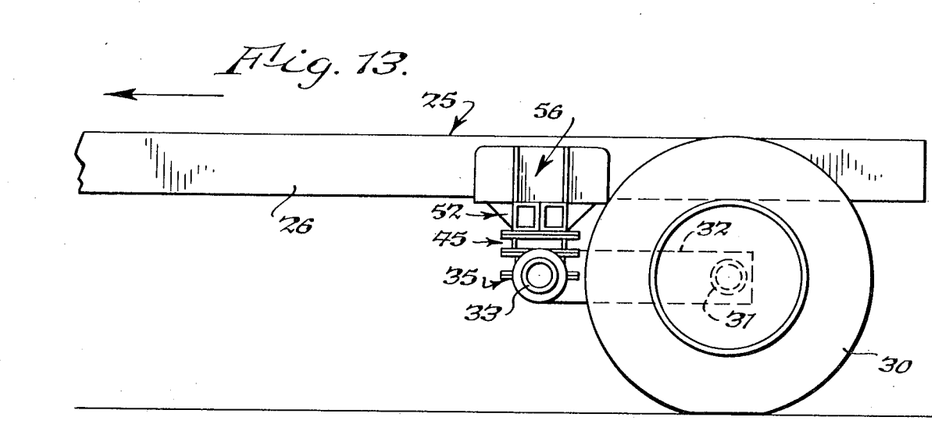
FIG. 13 is a side elevational view similar to FIG. 1 and illustrating a modified form of the invention embodying an individual suspension for each wheel.

*Single wheel suspension FIGS. 13 and 14*

It is apparent that the invention can be adapted to a heavy duty vehicle having the rear end of its frame supported by single wheels in contradistinction with the tandem two and three wheel suspensions previously described at each side of the vehicle. Such form of the invention is illustrated in FIGS. 13 and 14 from which it will be particularly noted that the same components are provided except that the outboard end of each "compensating" lever 95, instead of being connected through the shackle 96 with a companion "compensating" lever, is connected directly to the frame 25. Thus the frame 25 is provided at this point with cross beams 28 above the outboard end of the arm 32 at each side of the vehicle. Above each of these outboard ends a frame bracket 150 is provided which comprises side plates 151 secured to and depending from the cross beams 28, and which are connected at their bottom ends by a horizontal cross plate 152 on the top of which is secured the bottom plate 109 of the upper rubber block 108. It will be noted that this form of the invention operates in the same manner as the other forms, that is, upward movement of the wheel 30 causes upward movement of the stub axle 31 and arm 32, counterclockwise rotation of the cross shaft 33 in its rubber bushed bearings 35 and 65 (as viewed in the figures) and hence downward movement of the lever 95. This compresses the lower rubber body 108 into its bottom compression plate or cup 113 and through the links 125 compresses the top compression plate or cup 113 downwardly onto the top rubber body 108, this latter rubber body being held against downward movement by the frame bracket 150 so that the compression of these two rubber bodies form substantially the entire resilient resistance between the frame 25 and its wheel 30.

It will be noted that this form of the invention uses the same components as all of the other forms thereby not only to provide a distinct manufacturing economy through the use of a large number of identical parts but also to reduce the inventory of dealers throughout the country in stocking replacement parts for vehicles involved in wrecks.

As in the preceding description, in the following claims "wheel" is intended to include the ground engaging wheel means 30 supporting each stub axle regardless of whether in the form of a single wheel or in the form of the dual-tired wheel shown.

From the foregoing it will be seen that the present invention achieves the various objects and has the advantages previously set forth and also provides a wide variety of duo-wheel tandem, tri-wheel tandem and single axle suspensions which are principally composed of identical and interchangeable parts.

Except for the last of the following claims the reference characters can all be found on FIGS. 1–10, but this is only for convenience in applying the claims and does not infer that certain of the claims are not generic to all forms illustrated.

I claim:

1. A vehicle spring suspension adapted to be interposed between a vehicle frame (25) and a stub axle (31) supported by a rubber tired wheel (30) rotatable about the axis of said stub axle (31) and having an arm (32) having one end supported by said stub axle (31) and extending generally lengthwise of the line of travel of the vehicle, a horizontal cross shaft (33) journalled on said frame (25) to extend generally parallel with the axis of said wheel (30) and fixed to the other end of said arm (32), a lever (95) operatively connected with and projecting radially relatively to said cross shaft (33) to be oscillated thereby; wherein the invention comprises a first (108) and a second (108) rubber body, arranged to be jointly acted on in tandem in direct compression and expanding and contracting laterally toward and from the center line of the path of compression to provide substantially the entire resiliency in supporting said frame (25) on said wheel (30), a pair of backing plates (109) severally engaging the sides of said rubber bodies (108) which oppose each other, a pair of compression plates (113) severally engaging the sides of said rubber bodies (108) remote from the sides engaged by said backing plates (109), the backing plate (109) of one rubber body (108) being operatively connected to the outboard end of said lever (95) to transmit pressure therefrom compressively to said one rubber body (108), shackle linkage means (119–130) operatively connecting the compression plate (113) of said one rubber body (108) with the compression plate (113) of the other rubber body (108), and means (95, 33, 32, 31, 30) operatively connecting the backing plate (109) of the other rubber body (108) to said vehicle frame (25).

2. A vehicle spring suspension as set forth in claim 1 additionally including a third rubber body (131) operatively interposed and yieldingly holding in spaced relation said backing plates (109) of said first and second rubber bodies (108).

3. A vehicle spring suspension as set forth in claim 1 wherein each compression plate (113) is cup-shaped with a concave face provided with a flaring periphery (115) engaging said side of its rubber body (108) remoted from the side engaged by its backing plate (109) and wherein said side of each rubber body remote from the side engaged by its backing plate (109) is of convex form with a flaring periphery (113) being shallower than the flaring periphery (111) of the convex side of the companion rubber body (108) whereby the initial expansion and contraction of each rubber body (108) toward and from said center line is to conform it to the flaring periphery (115) of its compression plate (113).

4. A vehicle spring suspension as set forth in claim 1 wherein said shackle linkage means (119–130) comprises shackle links (125) on opposite sides of said rubber bodies (108), backing plates (109) and compression plates (113), cross bars (121) severally connecting opposite ends of said shacke links (125) and arranged across the sides of said compression plates (113) which are remote from each other, and means (119) pivotally connecting each compression plate (113) to its companion cross bar (121).

5. A vehicle spring suspension as set forth in claim 4 wherein said pivotally connecting means (119) is in the form of a rolling socket joint.

6. A vehicle spring suspension adapted to be interposed between a vehicle frame (25) and a stub axle (31) supported by a rubber tired wheel (30) rotatable about the axis of said stub axle (31) and having an arm (32) having one end supported by said stub axle (31) and extending generally lengthwise of the line of travel of the vehicle, a horizontal cross shaft (33) journalled on said frame (25) to extend generally parallel with the axis of said wheel (30) and fixed to the other end of said arm (32), a lever (95) operatively connected with and projecting radially relatively to said cross shaft (33) to be oscillated thereby; wherein the invention comprises a second rubber tired wheel (30) arranged in tandem relation to said first mentioned rubber tired wheel (30) and rotatable about an axis generally parallel with said axis of said stub axle (31), a second stub axle (31) supported by said second rubber tired wheel (30), a second arm (32) having one end supported by said second stub axle (31) and extending generally lengthwise of the line of travel of the vehicle toward said first mentioned stub axle (31), a second horizontal cross shaft (33) journalled on said frame (25) to extend generally parallel with the axes of said wheels (30) and fixed to the other end of said second arm (32), a second lever (95) fixed to and projecting outwardly from said second cross shaft (33) with its outboard end in vertically spaced relation to the outboard end of said first mentioned lever (95) and shackle means (108–130) including resilient means (108), pivotally connecting together said outboard ends of said first mentioned and second levers (95), said resilient means (108) permitting yieldingly resisted movement of said outboard ends of said first mentioned and second levers (95) toward each other and reacting to return them to a normal spaced relation provided by the shackle means (108–130).

7. A vehicle spring suspension as set forth in claim 6 wherein said resilient means (108) comprises at least one resilient rubber body (108).

8. A vehicle spring suspension as set forth in claim 6 wherein said shackle means (108–130) comprises resilient rubber bodies (108) severally secured to the sides, remote from each other, of said outboard ends of said first mentioned and second levers (95), compression plates (113) arranged against the faces of said rubber bodies (108) which are remote from each other, and shackle links (125) pivotally connecting said compression plates (113) together.

9. A vehicle spring suspension as set forth in claim 8 wherein said shackle linkage means (119–130) comprises shackle links (125) on opposite sides of said rubber bodies (108) and compression plates (113), cross bars (121) severally connecting opposite ends of said shackle links (125) and arranged across the sides of said compression plates (113) which are remote from each other, and means (119) pivotally connecting each compression plate (113) to its companion cross bar (121).

10. A vehicle spring suspension as set forth in claim 9 wherein said pivotally connecting means (119) is in the form of a rolling socket joint.

11. A vehicle spring suspension adapted to be interposed between a vehicle frame (25) and a stub axle (31) supported by a rubber tired wheel (30) rotatable about the axis of said stub axle (31) and having an arm (32) having one end supported by said stub axle (31) and extending generally lengthwise of the line of travel of the vehicle, a horizontal cross shaft (33) journalled on said frame (25) to extend generally parallel with the axis of said wheel (30) and fixed to the other end of said arm (32), a lever (95) operatively connected with and projecting radially relatively to said cross shaft (33) to be oscillated thereby, spring means (96) operatively interposed between the outboard end of said lever (95) and said frame (25) and resisting upward movement of said arm (32) with reference to said vehicle frame (25) to yieldingly support the vehicle frame 25 on said wheel; wherein the invention comprises said horizontal cross shaft (33) being so journalled on said frame (25) by an outer resilient rubber bushing (35) held in compressive relation with the outboard end of said cross shaft (33) by a bearing housing (38, 39) and arranged to be at least in part positioned outwardly beyond the plane of the inner circular face of the tire of said rubber tired wheel (30), and an inner resilient rubber bushing (65) held in compressive relation with the inboard end of said cross shaft (33) by a bearing housing (68, 69) arranged adjacent the longitudinal center line of the frame (25).

12. A vehicle spring suspension as set forth in claim 6 wherein each of said horizontal cross shafts (33) is so journalled on said frame by an outer bearing (35) arranged to be at least in part positioned outwardly beyond the plane of the inner circular face of the tire of its corresponding rubber tired wheel (30), and an inner bearing (65) arranged adjacent the longitudinal center line of the frame (25).

13. A vehicle spring suspension as set forth in claim 12 wherein each of said bearings (35, 65) is in the form of a resilient rubber bushing (36, 66) held in compressive relation with the corresponding end of said cross shaft (33) by a bearing housing (38, 39, 68, 69).

14. A vehicle spring suspension as set forth in claim 12 additionally including means (90, 92) permitting movement of one of said inner bearings (65) in a generally horizontal direction lengthwise of the line of travel of the vehicle to render said tandem rubber tired wheels (30) self-steering in rounding curves.

15. A vehicle spring suspension as set forth in claim 12 wherein each of said outer bearings (35) is in the form of a resilient rubber bushing (36) held in compressive relation with the outer end of the corresponding cross shaft (33) by a bearing housing (38, 39) and wherein the spring suspension additionally includes means (90, 92) permitting movement of one of said inner bearings (65) in a generally horizontal direction lengthwise of the line of travel of the vehicle to render said tandem rubber tired wheels (30) self-steering in rounding curves.

16. A vehicle spring suspension adapted to be interposed between a vehicle frame (25) and a stub axle (31) supported by a rubber tired wheel (30) rotatable about the axis of said stub axle (31) and having an arm (32) having one end supported by said stub axle (31) and extending generally lengthwise of the line of travel of the vehicle, a horizontal cross shaft (33) journalled on said frame (25) to extend generally parallel with the axis of said wheel (30) and fixed to the other end of said arm (32), a lever (95) operatively connected with and projecting radially relatively to said cross shaft (33) to be oscillated thereby, spring means (96) operatively interposed between the outboard end of said lever (95) and said frame (25) and resisting upward movement of said arm (32) with reference to said vehicle frame (25) to yieldingly support the vehicle frame (25) on said wheel; wherein the invention comprises said spring means (96) operatively interposed between the outboard end of said lever (95) and said frame (25) additionally including second rubber tired wheel (30) arranged in tandem relation to said first rubber tired wheel (30) and rotatable about an axis generally parallel with said axis of said stub axle (31), a second stub axle (31) supported by said second rubber tired wheel (30), a second arm (32) having one end supported by said second stub axle (31) and extending generally lengthwise of the line of travel of the vehicle toward said first mentioned stub axle (31), a second horizontal cross shaft (33) journalled on said frame (25) to extend generally parallel with the axes of said wheels (30) and fixed to the other end of said second arm (32), a second lever (95) fixed to and projecting outwardly from said second cross shaft (33) toward said first mentioned lever, a third rubber tired wheel (30) arranged in tandem between said first mentioned and second rubber tired wheels (30) and rotatable about an axis generally parallel with said axis of said first mentioned stub axle (31) a third stub axle (31) supported by said third rubber tired wheel (30), a third arm (32) having one end supported by said third stub axle (31) and extending generally lengthwise of the line of travel of the vehicle, a third horizontal cross shaft (33) journalled on said frame (25) to extend generally parallel with the axes of said wheels (30) and fixed to the other end of said third arm (32), a double ended lever (134) fixed at its center to said third cross shaft (33) and having one end (135) projecting generally along the line of travel of the vehicle to a position in vertically spaced relation to the outboard end of said first mentioned lever (95), a first shackle means (108–130) including resilient means (108) connecting together the outboard end of said first mentioned lever (95) with said one end (135) of said double ended lever (136), said double ended lever having another end (136) projecting generally along the line of travel of the vehicle to a position in vertically spaced relation to the outboard end of said second lever (95), and a second shackle means (108–130) including resilient means (108) connecting together the outboard end of said second lever (95) with said another end (136) of said double ended lever 134, the resilient means (108) of each of said first and second shackle means (108–130) permitting yieldingly resisted movement of said outboard ends of said first mentioned and second levers (95) toward their respective one (135) and another (136) ends of said double ended lever (134) and reacting to return them to a normal spaced relation provided by said shackle means (108–130).

References Cited

UNITED STATES PATENTS

| 2,920,903 | 1/1960 | Locker | 280—104.5 |
| 3,135,508 | 6/1964 | Boys | 267—21 |
| 2,202,615 | 5/1940 | Barenyi | 267—21 |

FOREIGN PATENTS 1,229,793  3/1960  France.

PHILIP GOODMAN, *Primary Examiner.*